June 26, 1951 — J. F. TRITLE — 2,558,594
SPRING APPLIED ELECTROMAGNETIC BRAKE OPERATOR
Filed Nov. 22, 1946
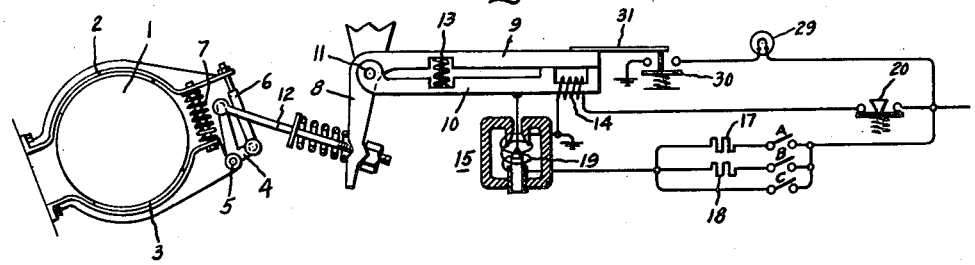
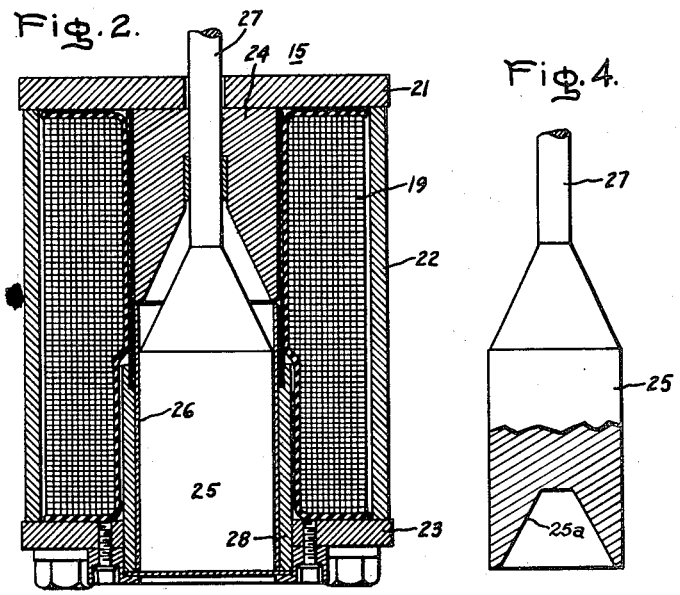
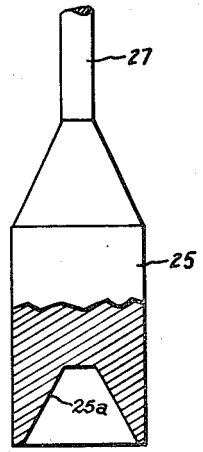
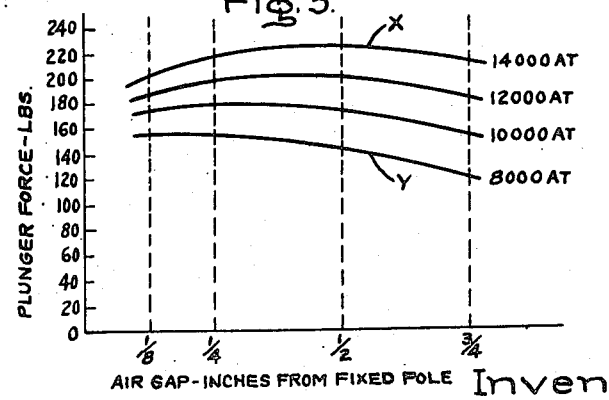
Inventor:
John F. Tritle,
by Browell S. Mack
His Attorney.

Patented June 26, 1951

2,558,594

UNITED STATES PATENT OFFICE 2,558,594

SPRING APPLIED-ELECTROMAGNETIC BRAKE OPERATOR

John F. Tritle, Erie, Pa., assignor to General Electric Company, a corporation of New York Application November 22, 1946, Serial No. 711,695

7 Claims. (Cl. 188—171)

My invention relates to an electric brake, and more particularly to an electric brake mechanism and control system for vehicles.

It is customary to equip modern vehicles, such as railway locomotives, street cars and trolley busses, with electromagnetically operated friction brakes in addition to the air brakes and mechanical or hand brakes as sometimes used. It is desirable that such a braking system provide a smooth and gradual deceleration of the vehicle in the case of a service application of such electromagnetic brakes under control of the operator, and also that they be capable of exerting maximum braking effort within a very short period of time, which may be required under emergency conditions. Another required feature is the provision of a holding brake for holding the vehicle stationary on an incline or grade.

Accordingly, it is an object of my invention to provide an improved electromagnetic braking apparatus for drum-type brakes.

It is a further object of my invention to provide an improved electromagnetic brake of the solenoid-applied gravity-released type.

It is also an object of my invention to provide an improved electromagnetic brake in which emergency application of the brake is substantially instantaneous, and in which service application of the brake is gradual and under close control of the operator.

According to one embodiment of my invention, I provide a brake-operating mechanism for a conventional type of drum brake in which the controlled braking force is exerted by the action of an electromagnetic solenoid mechanism, and in which the emergency application is instantaneously produced by the deenergization of a magnetic holding coil, thereby allowing heavy compression springs to substantially instantaneously apply maximum braking effort. For holding the vehicle at rest on an incline, the spring-applied brake is utilized; thereby no power loss accompanies the application of such holding brake as is customary in solenoid-operated holding brakes. The electromagnetic actuator for the service brake application is designed so that the braking force exerted is substantially constant throughout the length of travel of the solenoid plunger, thereby permitting constant braking force to be exerted irrespective of wear of the brake linings or other slight misadjustments in the braking mechanism.

In order that my invention may be more readily understood, I shall now refer to the accompanying drawing in which Fig. 1 is a diagrammatic representation of the mechanical structure of the brake-operating apparatus and including the elementary circuit control diagram; Fig. 2 is a partial cross sectional view of the electromagnetic actuator or solenoid for operating the braking mechanism; Fig. 3 shows characteristic performance curves of the electromagnetic operator shown in Fig. 2; and Fig. 4 is an alternative construction for the solenoid plunger shown in Fig. 2.

Referring now to Fig. 1, I have shown a brake drum 1, such as is customarily mounted on the axle or propeller shaft of a vehicle, and a pair of brake shoes 2 and 3 disposed around the drum and capable of drum-engaging movement to apply braking effort. The brake shoes 2 and 3 are compressed on the drum by means of the bellcrank 4 which is pivoted to brake shoe 3 at point 5 for rotation in a clockwise direction to apply braking effort. The top brake shoe 2 is drawn towards the drum by means of the linkage 6 which connects the right end arm of the bellcrank with the upper brake shoe 2. A biasing spring 7 is disposed between the brake shoes 2 and 3 and assists in returning the shoes to a brake-released position. Braking force is transmitted to the bellcrank 4 and brake shoes by means of the link 12 and crank arm 8 which is an integral part of the upper operating lever 9. The upper lever 9 and lower lever 10 are both pivoted at the stationary support 11. It will be noted that the upper lever 9 is connected to the brake-shoe-operating bellcrank 4 by means of the adjustable link 12, and braking force is applied by movement of the lever 9 in an upward or counterclockwise direction.

The levers 9 and 10 are biased apart by means of the compression spring 13, but under normal operating conditions are maintained locked together by the electromagnetic holding device shown at the right end of the lever 10, which holding device is energized by means of the magnetizing coil 14. The upper lever 9 thus forms an armature for the magnetic holding device. Thus for normal service application and release of the brake, the levers 9 and 10 operate as a single unit and braking effort is applied by means of the electromagnetic operator, shown generally in Fig. 1 at 15. The direct current energizing circuit for the solenoid operator 15 may be traced from the positive side of the power line, which may be the vehicle battery, engine driven generator, or an external source of power in the case of a trolley-operated vehicle, through the switches A, B and C arranged in parallel;

the resistances 17 and 18 in series, respectively, with switches A and B; thence to the operating coil 19 of the electromagnetic operator and back to the negative side of the source of power. The switches A, B and C have been shown in simplified form but it should be understood that ordinarily they will form a part of the operator's brake controller and will be mechanically arranged to close in a predetermined sequence. Thus, A will be closed initially, thereby inserting the resistance 17 in the solenoid circuit and limiting the braking effort to some predetermined minimum value. If it is desired to increase the braking effort, switch B may then be closed inserting a lesser amount of resistance 18 in series with the solenoid circuit and thereby increasing the magnetizing current in the solenoid coil 19 and increasing the braking effort; and in the case of a desired maximum service application of the brake, the switch C may be closed thereby placing the solenoid coil 19 directly across the power line and providing for the maximum exertion of force by the solenoid armature and consequent maximum braking effort.

As mentioned previously, the emergency application of the brake is performed by the heavy compression spring 13 which is normally restrained in a compressed state by means of the electromagnetic holding coil 14 and its associated armature, the right end of the operating lever 9. The magnetizing coil 14 is placed across the source of power and in series circuit relationship with the normally closed switch 20 which may be arranged to be operated by a "deadman's pedal," by an operating lever marked "emergency application," and may also be operated by the same control that is used to turn off power to the vehicle.

In the last-mentioned case, the holding coil 14 is deenergized when the vehicle is standing still and thereby serves to act as a holding brake and does not require continuous absorption of current customarily found in electromagnetic holding brakes. An important feature of the electromagnetic holding coil 14 and its associated operation is in its "fail-safe" feature, in that it will operate instantaneously upon failure of electrical motive power or loss of trolley power to set the brakes in a minimum of time. I have found that the emergency brake application is carried out in approximately one-fiftieth of a second which is a marked improvement over the time necessary to apply emergency brakes by air pressure, which requires considerable time for the build-up of maximum pressure in the brake cylinder, or in the case of an electromagnetically applied brake which requires an appreciable time for full braking current to be developed in a large solenoid.

In Fig. 2 I have shown a detail view, partially in section, of the novel features of the operating solenoid 15 for my electromagnetic brake. While it is obvious that the braking mechanism and control system described in connection with Fig. 1 may be operated with any conventional solenoid operator, I have found that very good operation is obtained by use of the solenoid shown in Fig. 2 which provides a substantially constant thrust or operating force throughout the range of travel of the solenoid armature. The solenoid operator 15 consists of a relatively heavy casing of magnetic material including the top piece 21, the cylindrical coil jacket 22, and bottom plate 23 arranged to form a unitary structure and provide a magnetic flux path surrounding the energizing coil 19. Centrally located at the top and forming a part of the magnetic flux path is the stationary pole piece 24 which, as shown, is provided with a conically recessed pole face into which the conically tapered upper portion of the movable armature or plunger 25 is adapted to fit. The plunger 25 is arranged to move freely within the solenoid, being guided and prevented from sticking by the insulating non-magnetic sleeve 26, and is provided with an extending operating rod 27 which passes through a central guide in the pole piece 24 and is connected to the lower brake operating lever 10 for application of braking effort. Disposed about the lower end of the plunger is a cylindrical sleeve 28 of magnetic material which is connected with the lower end plate 23 of the solenoid casing, thereby extending the path for the magnetic flux over a greater area and providing a lower reluctance path than is customarily found in usual solenoid construction. The provision of the magnetic sleeve 28 results in obtaining a characteristic wherein the force or thrust exerted by the plunger 25 is substantially constant throughout the range of travel of the plunger due to the relatively rapid increase in reluctance at the lower end of the plunger as the plunger moves upward. There is also a certain amount of downward pull exerted on the plunger due to the flux leakage into the end of the plunger from the lower case member 23 and the lower end of the sleeve 28. Solenoids are usually designed to provide a rapid and increasing thrust as the plunger approaches the fixed pole; however, such a characteristic is undesirable in the case of a solenoid designed for operation of a friction brake as it results in a tendency to immediately exert maximum braking effort, and as the solenoid approaches the limit of its travel there is an increased tendency for acceleration to its maximum travel position, resulting in undesirable freezing of the brake bands on the brake drum.

In order that the brake application may be made smoothly, it is desirable that the braking effort be substantially constant irrespective of the position of the plunger within the solenoid, and another marked advantage is obtained in that wear of the brake shoes or brake drum, or looseness in the mechanical linkage does not result in a change in braking effort, since approximately the same amount of braking force will be exerted with the plunger in a low position as with the plunger in a higher position, corresponding to the condition of worn brake bands or excessive play in the mechanical system.

Reference should now be had to Fig. 3 which shows the performance characteristics of the solenoid actuator 15, and it will be noted that in the range of ampere-turns used in the normal operation of a typical system, that is, from about 8000 to 14,000 ampere-turns, the plunger pull or force in pounds, and therefore the braking effort, does not vary appreciably with various positions of the plunger within the solenoid. For example, on curve $x$, representing 14,000 ampere-turns and with the plunger 25 at a position of maximum air gap from the fixed pole, of three-fourths of an inch, the plunger force is approximately two hundred and twelve pounds, whereas at an air gap of one-eighth of an inch the plunger force has actually decreased to approximately two hundred pounds. Also, for example, on curve $y$, representing 8000 ampere turns, corresponding to the circuit conditions when switch A is closed and resistor 17 is inserted in series with the solenoid coil 19, it will be noted that at maximum air gap the force is approximately one hundred twenty-five pounds; and at one-eighth inch air gap the force is approximately one hundred and fifty pounds. For all values of magnetizing current lying between the above-mentioned maximum and minimum values it will be found that for any definite value of ampere-turns, the plunger force is substantially the same throughout the complete range of travel of the solenoid plunger.

It will be noted in Fig. 3 that as the travel of the plunger decreases, referring to the region of the curves between zero and one-quarter inch air gap, there is a tendency for the plunger thrust to decrease, thereby resulting in an actual decrease in force as the plunger approaches the fixed pole. This effect, and in fact the shape of all the plunger force-air gap curves, may be accentuated by modifications of the magnetic structure; for example, the lower end of the plunger 25 may be conically recessed similar to the undersurface of the fixed pole 24, as shown at 25a in partial section in Fig. 4, thus providing a still greater leakage path and increase of reluctance at the lower end of the plunger and resulting in an increased downward or counteracting pull as the solenoid plunger moves upward. The thickness, length and configuration of the magnetic sleeve 28 may also be varied to provide slightly varying pull characteristics in a solenoid of this type. It will be noted that the solenoid is of relatively massive construction and that the operating coil 19 is purposely constructed for low current consumption and high heat radiating capacity, thereby permitting continuous operation over a long period of time without undue temperature rise in the solenoid.

In reviewing the operation of the braking system and its control circuit, it is assumed that the levers 9 and 10 are locked together by energization of the holding coil 14 and that the solenoid 15 is deenergized, switches A, B and C all being in the open position. This corresponds to the arrangement of parts of my system under normal running conditions of the vehicle with the brakes released. If it is desired to apply braking effort, the operator closes the desired switch, depending upon the amount of braking effort desired, and the solenoid 15 is energized, thereby exerting force through the push rod 27 against the levers 9 and 10 in an upward direction. This, in turn, moves the bellcrank 4 in a clockwise direction, tightening the brake bands 2 and 3 on the drum and thereby reducing vehicle speed. After vehicle speed has been reduced sufficiently, the operator may then release the brakes by opening the braking switch A, B, or C, as the case may be, and the levers 9 and 10 will move back to their original position under gravity due to the weight of the levers and the heavy solenoid plunger, and assisted by the expansion of the compressed spring 7. In the event the operator desires to make an emergency application of the brakes, it is only necessary to operate the switch 20 momentarily, thereby opening the circuit through the holding coil 14 and allowing its magnetic circuit to release the armature, that is, the upper operating lever 9. The action of the heavy compression spring 13 will then rapidly force the upper lever 9 and the associated brake operating linkages to the position of maximum braking effort, thereby applying maximum braking force in a relatively short period of time. After an emergency application in order to release the brake, it is only necessary for the operator to close the switch C, thereby fully energizing the solenoid 15 and forcing the lower lever 10 upward against the compression spring 13 and in contact with the upper lever 9. Since the emergency switch 20 is spring-biased to a reclosing position, the holding coil 14 on the lower lever 10 will be energized, and upon contact with the upper lever 9, the two levers 9 and 10 will be locked together magnetically. The operator may then open the brake application switch C and the brake will be released by gravity as previously described.

In case it is desired to hold the vehicle in a standing position on a grade, it is only necessary for the operator to open the emergency switch 20 which releases the holding coil 14, thereby applying full braking effort. If this condition is to remain for any period of time, switch 20 may be locked in the open position thereby preventing wasteful flow of current in the holding coil 14 during this period. If desired, a signal light 29 connected in series with the switch 30 and across the source of power may be provided to give a visual indication of the braking condition then in effect. It will be noticed that the switch 30 is biased to a closed position and is maintained in a normally open position by means of the arm 31 rigidly attached to the brake operating lever 9. Thus, as long as the brakes are in the released position, the operating lever 9 and switch 30 will be in the position as shown in Fig. 1 and the indicating light will not be energized. In the event of an emergency application, a holding application, or an ordinary service application of the brakes, as soon as the operating lever 9 moves upward to a braking position the switch 30 will be closed, thereby completing the circuit through the indicating light 29 and giving visual indication to the opeartor that braking force is being exerted, or that the holding brake is set.

From the foregoing description it will be seen that I have provided an improved type of electromagnetic braking mechanism which not only permits gradual and smooth application of braking effort under control of the operator and which also provides for parking or holding the vehicle stationary without the use of electric power, but also provides for substantially instantaneous application of full braking effort in case of an emergency. It should be emphasized that the above system is fail-safe in that in the event of loss of power, the emergency brake will be applied and also the holding brake will remain applied as long as power is off, thereby preventing coasting of the car out of control with no available power for braking, as is required with electromagnetically-applied emergency or parking brakes. With the system as shown, the need for mechanical or air brakes is largely eliminated as a complete range of braking functions is provided by my invention.

While I have shown and described particular embodiments of my invention, it will be obvious to those skilled in the art that changes and modifications may be made without departing from my invention in its broader aspects, and I, therefore, aim in the appended claims to cover all such changes and modifications as fall within the true spirit and scope of my invention.

What I claim as new and desire to secure by Letters Patent of the United States, is:

1. An operating mechanism for a drum-type friction brake comprising, a pair of operating levers, link means connecting one of said levers with said brake, resilient expansion means disposed between said levers for urging said levers apart, means for maintaining said levers locked together against the expansion of said resilient means, and electrically operated actuating means arranged to move said levers in a direction to apply braking effort upon energization of said actuating means.

2. An operating mechanism for a drum-type friction brake comprising, a pair of pivoted operating levers, link means connecting one of said levers with said brake, expansion spring means disposed between said levers for urging said levers apart, magnetic holding means for maintaining said levers locked together against the expansion of said spring means, and electromagnetic actuating means for applying graduated and controllable force to move said levers to a brake-application position upon energization.

3. An operating mechanism for a drum-type friction brake comprising, a pair of pivoted operating levers, link means connecting one of said levers with said brake, expansion spring means disposed between said levers for urging said levers apart, magnetic holding means for maintaining said levers locked together against the expansion of said spring means, and electromagnetic actuating means for applying graduated and controllable force to move said levers to a brake-application position upon energization, said electromagnetic actuating means and operating levers being gravity-operated to effect release of braking effort upon deenergization of said electromagnetic actuating means.

4. An operating mechanism for a mechanical brake comprising, a first operating lever, a linkage connecting said first lever with said brake, a second operating lever pivoted to said first lever, resilient means disposed between said levers for forcing said levers apart, holding means for maintaining said levers locked together, means for releasing said holding means to permit said resilient means to force said first lever to a position of maximum braking effort, and electromagnetic actuating means for moving said levers in unison when locked together to apply graduated braking force.

5. An operating mechanism for a mechanical brake comprising, a first operating lever, a linkage connecting said first lever with said brake, a second operating lever pivoted to said first lever, resilient means disposed between said levers for forcing said levers apart, holding means for maintaining said levers locked together, means for releasing said holding means to permit said resilient means to force said first lever to a position of maximum braking effort, and electromagnetic actuating means for moving said levers in unison when locked together to apply graduated braking force, said electromagnetic actuating means exerting substantially constant force throughout its range of movement.

6. An operating mechanism for a mechanical brake comprising, a first operating lever, a linkage connecting said first lever with said brake, a second operating lever pivoted to said first lever, resilient means disposed between said levers for forcing said levers apart, electromagnetic holding means mounted on said second lever for maintaining said levers magnetically locked together, and electromagnetic actuating means connected to said second lever for moving said levers in unison when locked together to apply braking force to said linkage and brake.

7. An operating mechanism for a mechanical brake comprising, a first lever having an armature portion integral therewith, link means connecting said first lever with said brake, a second lever pivoted to said first lever, spring means disposed between said levers for urging said first lever to a braking position, an electromagnet integral with said second lever and cooperating with said armature portion of said first lever for maintaining said levers locked together, and electromagnetic actuating means associated with said second lever for moving said first and second levers to a braking position.

JOHN F. TRITLE.

REFERENCES CITED

The following references are of record in the file of this patent:

UNITED STATES PATENTS

| Number | Name | Date |
| --- | --- | --- |
| 609,124 | Skinner | Aug. 16, 1898 |
| 837,400 | Grosvenor | Dec. 4, 1906 |
| 1,852,857 | Price | Apr. 5, 1932 |
| 1,955,561 | Pickering | Apr. 17, 1934 |
| 1,961,780 | Price | June 5, 1934 |
| 1,991,903 | Logan | Feb. 19, 1935 |
| 2,065,259 | Ball et al. | Dec. 22, 1936 |
| 2,278,967 | Allen | Apr. 7, 1942 |
| 2,343,806 | Scofield | Mar. 7, 1944 |
| 2,344,178 | Sparrow | Mar. 14, 1944 |